(12) United States Patent
Ahn et al.

(10) Patent No.: US 12,358,433 B2
(45) Date of Patent: Jul. 15, 2025

(54) VEHICLE SLIDING CONSOLE

(71) Applicants: Hyundai Motor Company, Seoul (KR); Kia Corporation, Seoul (KR)

(72) Inventors: Gye Young Ahn, Seoul (KR); Kyoung Sik Kim, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 569 days.

(21) Appl. No.: 17/892,648

(22) Filed: Aug. 22, 2022

(65) Prior Publication Data

US 2023/0264633 A1 Aug. 24, 2023

(30) Foreign Application Priority Data

Feb. 21, 2022 (KR) .......................... 10-2022-0022421

(51) Int. Cl.
*B60R 7/04* (2006.01)
(52) U.S. Cl.
CPC ...................................... *B60R 7/04* (2013.01)
(58) Field of Classification Search
CPC .............. B60H 1/247; B60H 1/00524; B60H 1/00528; B60H 1/00535; B60H 1/00564; B60H 1/00271; B60R 2011/0007; B60R 2011/0084; B60R 7/04; B60R 7/06; B60N 2/767; B60N 2/773; B60N 2/793; B60N 2/763; B60N 3/104
USPC .. 296/208, 37.14, 190.09, 37.1, 37.8, 37.12, 296/24.34; 224/282; 62/244; 248/311.2
See application file for complete search history.

(56) References Cited

U.S. PATENT DOCUMENTS

| | | | | |
|---|---|---|---|---|
| 6,135,529 | A * | 10/2000 | De Angelis | B60R 7/04 224/281 |
| 7,937,954 | B2 * | 5/2011 | Kang | B60N 3/104 62/3.61 |
| 9,308,871 | B2 * | 4/2016 | Winklbauer | B60H 1/0055 |
| 11,034,209 | B2 * | 6/2021 | Cano | B60H 1/00564 |
| 11,814,012 | B2 * | 11/2023 | Ahn | B60H 1/246 |
| 2005/0248170 | A1 | 11/2005 | Kawamoto et al. | |
| 2006/0258282 | A1 * | 11/2006 | Heck | B60H 1/244 454/143 |
| 2007/0075107 | A1 | 4/2007 | Brancheriau et al. | |

(Continued)

FOREIGN PATENT DOCUMENTS

| | | | | |
|---|---|---|---|---|
| FR | 3075697 A1 * | 6/2019 | | B60H 1/00564 |
| JP | 2001164827 A | 6/2001 | | |

(Continued)

*Primary Examiner* — Amy R Weisberg
*Assistant Examiner* — Veronica M Condo
(74) *Attorney, Agent, or Firm* — Slater Matsil, LLP (57) ABSTRACT

An embodiment sliding console of a vehicle includes a rail, a console body connected to the rail and configured to slide on the vehicle floor, a first duct disposed in the console body and configured to slide with respect to the console body, the first duct having a first hook configured to selectively fix a position when an inlet of the first duct is matched with an outlet of a floor duct, a second duct disposed in the console body such that a position thereof is fixed, coupled to an outlet of the first duct to overlap the first duct like a double pipe, and configured to slide with respect to the first duct, and a second hook configured to restrict relative sliding of the first duct and the second duct in accordance with an overlap length of the first duct and the second duct.

20 Claims, 7 Drawing Sheets

(56) References Cited

U.S. PATENT DOCUMENTS

| | | | | |
|---|---|---|---|---|
| 2009/0058120 A1* | 3/2009 | Ioka | ............................ | B60R 7/04 |
| | | | | 296/24.35 |
| 2009/0179449 A1* | 7/2009 | Shibata | .................. | B60N 3/104 |
| | | | | 296/37.8 |
| 2022/0227202 A1* | 7/2022 | Maier | ................ | B60H 1/00542 |

FOREIGN PATENT DOCUMENTS

| JP | 2004210006 A | * | 7/2004 |
|---|---|---|---|
| JP | 3831827 B2 | | 10/2006 |
| JP | 2017039361 A | | 2/2017 |
| KR | 101852757 B1 | | 5/2018 |
| KR | 101865763 B1 | | 6/2018 |
| KR | 101877973 B1 | | 7/2018 |
| KR | 20220108552 A | | 8/2022 |

\* cited by examiner

VEHICLE SLIDING CONSOLE

CROSS-REFERENCE TO RELATED APPLICATIONS

This application claims the benefit of Korean Patent Application No. 10-2022-0022421, filed on Feb. 21, 2022, which application is hereby incorporated herein by reference.

TECHNICAL FIELD

The present invention relates to a vehicle sliding console.

BACKGROUND

In general, an automotive console includes a moving part and a fixed part in a broad meaning and has a structure in which the upper portion of a hook is fixed in a lower plate groove of the fixed part when the moving part is moved with the fixed part and a duct contracts.

Such a console employs a type in which when the console is moved, the hook is fixed to a duct stopper on a rail and the lower plate pushes a protrusion at the upper portion of the hook, whereby the hook is unlocked.

However, according to this type of the related art, fixing is not sufficiently made between the moving part and the fixed part, so shaking and noise are generated. Further, when a vehicle is parked on a slope, dampening is generated due to poor positioning of the moving part.

In detail, the upper protrusion of the hook included in the moving part should be fixed in the lower plate groove of the fixed part, but there is a problem that when the console slides forward, a gap is generated between the fixed part and the moving part and the upper protrusion of the hook is not fixed well in the groove of the lower plate.

Further, according to the structure, when the lower plate pushes the hook, the hook fixed in the groove of the fixed plate is separated by rotating, but there is a problem that since accumulated scattering of the dimensions and assembly dimensions of parts is easily generated for the characteristics of injection molds, the strength of the structure for fixing and separating the hook decreases when accumulated scattering is generated.

The description provided above as a related art of the present invention is just for helping understanding the background of the present invention and should not be construed as being included in the related art known by those skilled in the art.

SUMMARY

The present invention relates to a vehicle sliding console. Particular embodiments relate to a vehicle sliding console of which the weight and the manufacturing cost can be decreased because it is possible to improve the performance of the sliding console by strongly and reliably fixing a moving part and a fixed part by applying a structure, which additionally has an assistant hook in the fixed part without using a hook of the related art for a fixing concept of the moving part and the fixed part in a structure for unlocking or locking the moving part from or to a duct stopper on a rail using a hook, to the sliding console, and it is possible to greatly reduce the size of a lower plate by applying the assistant hook.

An embodiment of the present invention provides a vehicle sliding console of which the weight and the manufacturing cost can be decreased because it is possible to improve the performance of the sliding console by strongly and reliably fixing a moving part and a fixed part by applying a structure, which additionally has an assistant hook in the fixed part without using a hook of the related art for a fixing concept of the moving part and the fixed part in a structure for unlocking or locking the moving part from or to a duct stopper on a rail using a hook, to the sliding console, and it is possible to greatly reduce the size of a lower plate by applying the assistant hook.

A vehicle sliding console includes a rail installed on a vehicle floor, a console body connected to the rail and sliding on the floor, a first duct disposed in the console body to be able to slide with respect to the console body and having a first hook configured to selectively fix a position when an inlet of the first duct is matched with an outlet of a floor duct connected to an air-conditioning system of a vehicle, a second duct disposed in the console body such that a position thereof is fixed, coupled to an outlet of the first duct to overlap the first duct like a double pipe, and being able to slide with respect to the first duct, and a second hook configured to restrict relative sliding of the first duct and the second duct in accordance with an overlap length of the first duct and the second duct.

The rail may extend in a front-rear direction of the vehicle, the console body may slide forward and backward, and the floor duct may extend forward and backward.

The first duct and the second duct may extend in a front-rear direction of the vehicle, the first duct may slide forward and backward with the console body, and the second duct may slide forward and backward with the first duct.

The outlet of the floor duct may be connected to the inlet of the first duct, an outlet of the first duct may be connected to an inlet of the second duct, and a rear end of the second duct may be connected to an interior of the vehicle.

A duct rail may be disposed on the console body and the second duct may slide the first duct through the duct rail.

A stopper may be disposed at the rail, and a position of the first hook may be fixed through a spring when the inlet of the first duct is matched with the outlet of the floor duct.

A state in which the inlet of the first duct is matched with the outlet of the floor duct, a position of the first duct is fixed by the first hook, and the first duct and the second duct are fixed by the second hook may be a neutral state.

A state in which the console body slides forward, and the first duct and the second duct are fixed by the second hook may be a forward-sliding state.

A state in which the console body slides backward, a position of the first duct is fixed by the first hook, the second hook is released, and the first duct and the second duct slide may be a backward-sliding state.

The first hook may be released when the console body slides forward with the inlet of the first duct and the outlet of the floor duct matched.

The second hook may be disposed at the console body, and when the overlap length of the first duct and the second duct is increased, the second hook may be fixed and may restrict relative sliding of the first duct and the second duct.

The vehicle sliding console may further include a sliding bracket disposed at the first duct and having a first protrusion and a second protrusion and a lower plate disposed at the console body and configured to support and fix the second hook.

When the overlap length of the first duct and the second duct is increased, the second hook may be fixed to the sliding bracket and may restrict relative sliding of the first duct and the second duct.

When the console body slides forward, the lower plate may push the second protrusion and simultaneously the first hook may be pushed and released by the first protrusion.

The second hook may restrict relative sliding of the first duct and the second duct by fixing the first duct and the second duct by rotating.

According to the vehicle sliding console of embodiments of the present invention, it is possible to improve the performance of the sliding console by strongly and reliably fixing a moving part and a fixed part by applying a structure having an additional assistant hook in the fixed part without using a hook of the related art for a fixing concept of the moving part and the fixed part in a structure for unlocking or locking the moving part from or to a duct stopper on a rail using a hook, and it is possible to greatly reduce the size of a lower plate by applying the assistant hook, whereby it is possible to decrease the weight and the manufacturing cost.

The embodiments of the present invention are not limited to the embodiments described above and other embodiments can be clearly understood by those skilled in the art from the following description.

BRIEF DESCRIPTION OF THE DRAWINGS

The above and other objectives, features and other advantages of embodiments of the present invention will be more clearly understood from the following detailed description when taken in conjunction with the accompanying drawings, in which.

DETAILED DESCRIPTION OF ILLUSTRATIVE EMBODIMENTS

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all modifications, equivalents, and substitutions are included in the scope and spirit of the present invention.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

The present invention will be described hereafter in detail by describing exemplary embodiments of the present invention with reference to the accompanying drawings. Like reference numerals given in the drawings indicate like components.

Figure 1:
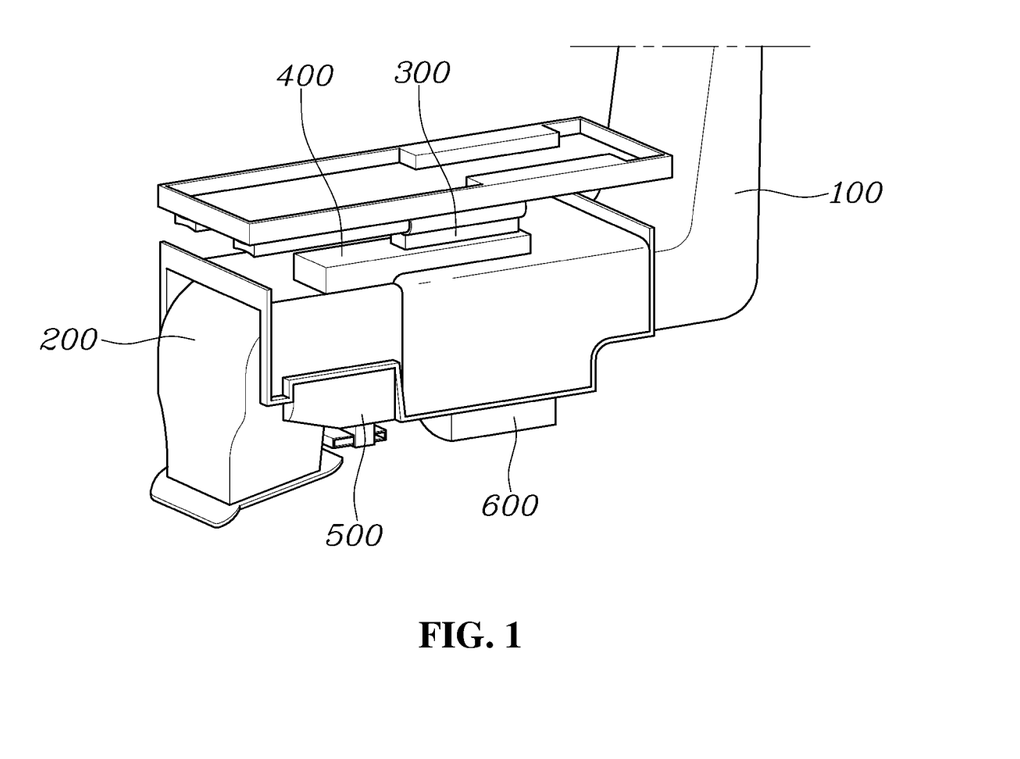
FIG. 1 is a view showing a vehicle sliding console according to an embodiment of the present invention.
Figure 2:
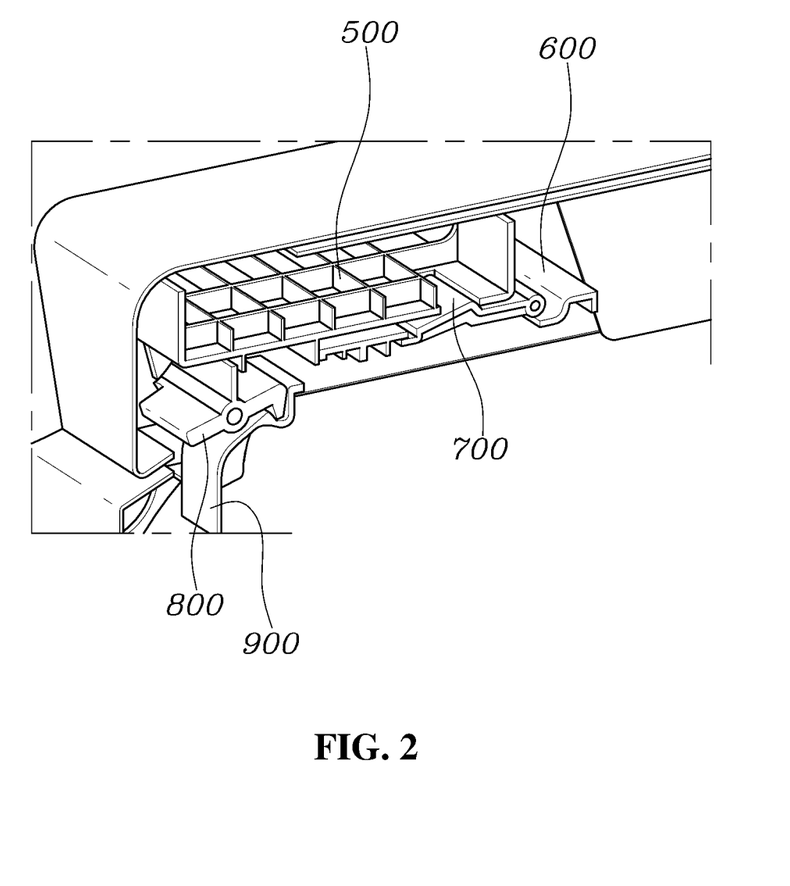
FIG. 2 is a view showing a first hook disposed at a first duct and a second hook that restricts relative sliding of the first duct and a second duct.
Figure 3:
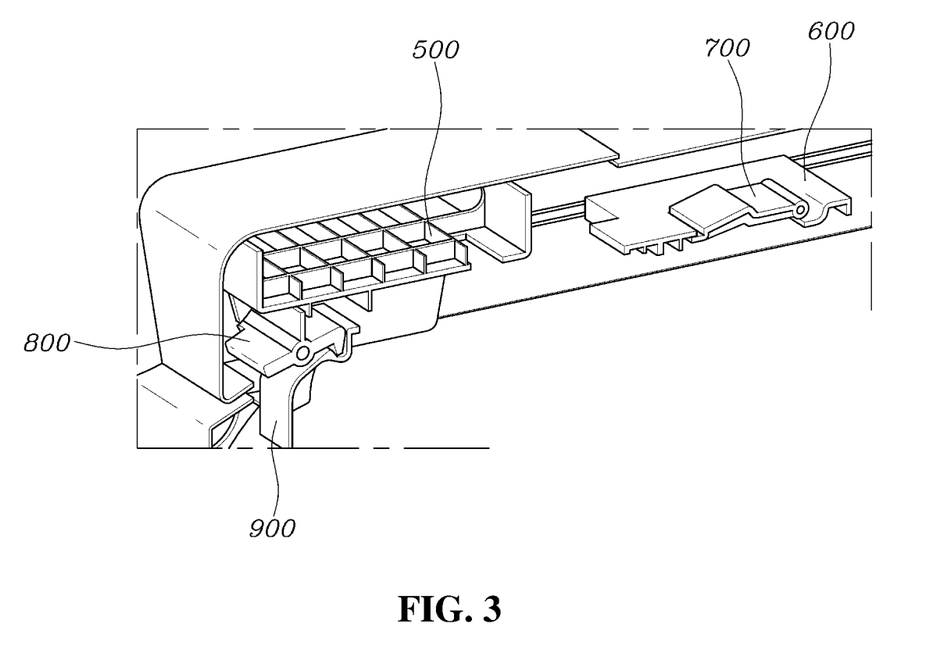
FIG. 3 is a view showing the state in which the first duct and the second duct slide when the position of the first duct is fixed and the second hook is released.
Figure 4:
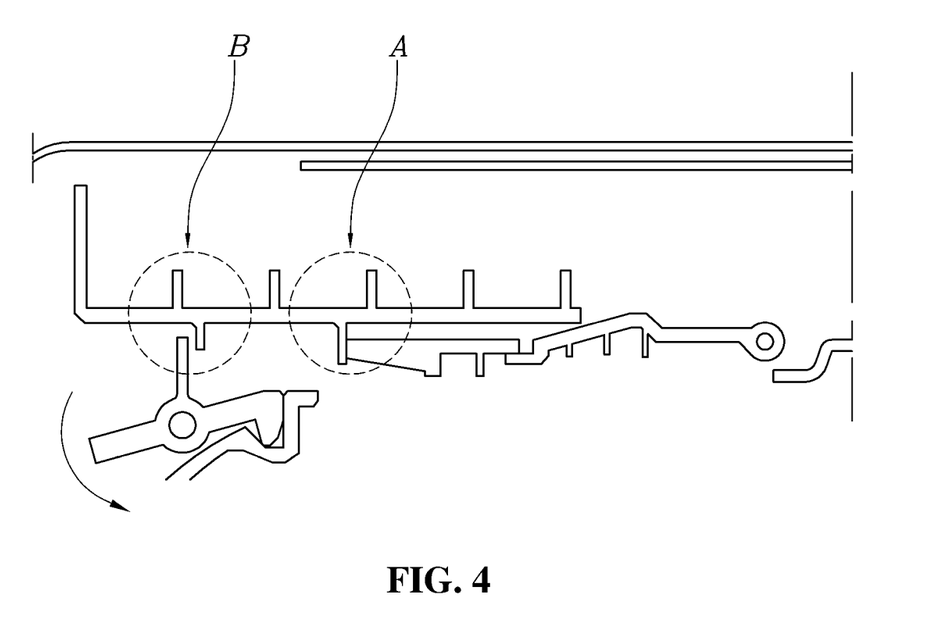
FIG. 4 is a view showing a sliding bracket having a first protrusion and a second protrusion.
Figure 5:
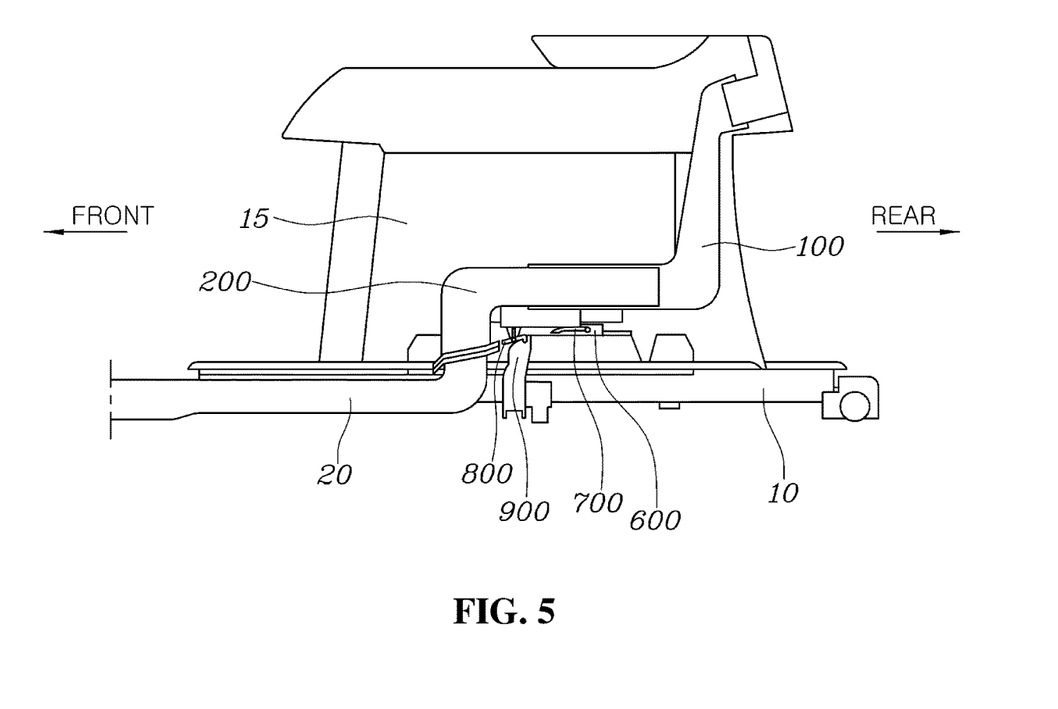
FIGS. 5 to 7 are views showing states in which a console body is at a neutral position, is slid forward, and is slid backward, respectively.
Figure 6:
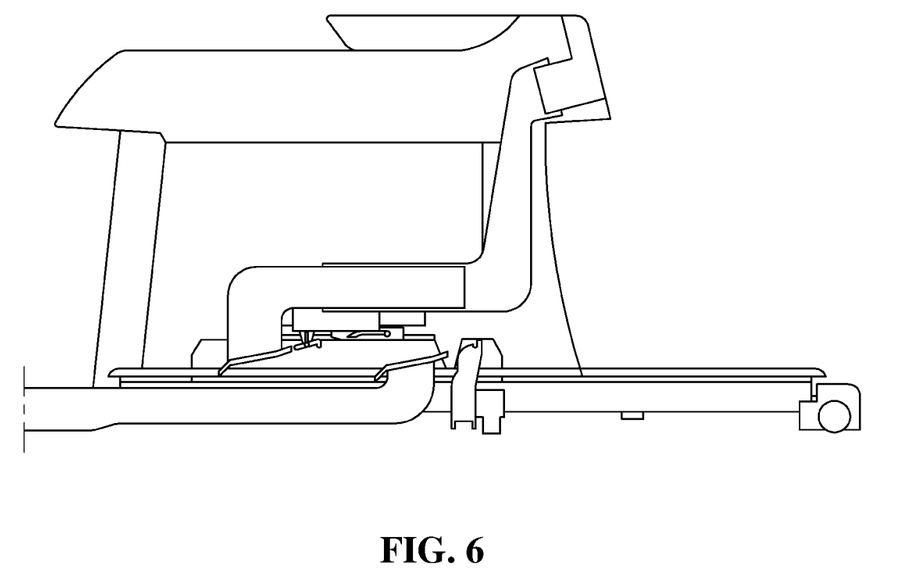
Figure 7:
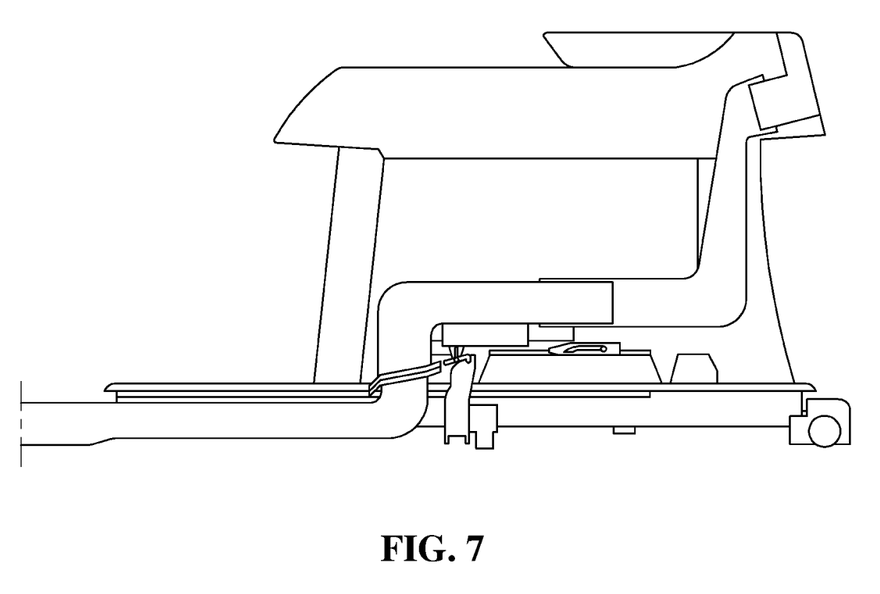

FIG. 1 is a view showing a vehicle sliding console according to an embodiment of the present invention. FIG. 2 is a view showing a first hook disposed at a first duct and a second hook that restricts relative sliding of the first duct and a second duct. FIG. 3 is a view showing the state in which the first duct and the second duct slide when the position of the first duct is fixed and the second hook is released. FIG. 4 is a view showing a sliding bracket having a first protrusion and a second protrusion. FIGS. 5 to 7 are views showing states in which a console body is at a neutral position, is slid forward, and is slid backward, respectively.

FIG. 1 is a view showing a vehicle sliding console according to an embodiment of the present invention. Referring to FIG. 1, a vehicle sliding console includes a rail 10 installed on a vehicle floor, a console body 15 connected to the rail and sliding on the floor, a first duct 200 disposed in the console body 15 to be able to slide with respect to the console body 15 and having a first hook 800 configured to selectively fix a position when an inlet of the first duct 200 is matched with an outlet of a floor duct 20 connected to an air-conditioning system of a vehicle, a second duct 100 disposed in the console body 15 such that the position thereof is fixed, coupled to an outlet of the first duct 200 to overlap the first duct 200 like a double pipe, and being able to slide with respect to the first duct 200, and a second hook 700 restricting relative sliding of the first duct 200 and the second duct 100 in accordance with the overlap length of the first duct 200 and the second duct 100.

Embodiments of the present invention can secure strong fixation of a moving part and a fixed part and reduce the size of a lower plate 600 by applying a structure additionally having an assistant hook in the fixed part without using a hook of the related art for the fixing concept between the moving part and the fixed part.

In order to extend or contract the sliding structure and ducts of a vehicle console, there is a need for a rail 10 on which a console body can slide a device for adjusting the overlap length of a plurality of ducts. To this end, there is a need for a fixing device of the console body and the ducts and a fixing device between the ducts.

The ducts are fixed by fixing the second hook 700 to the first duct 200. When the overlap length of the first duct 200 and the second duct 100 is increased, the second hook 700 is fixed to a sliding bracket 500, thereby restricting relative sliding of the first duct 200 and the second duct 100. The second hook 700 is fixed and supported through the lower plate 600 and the lower plate 600 may be disposed at the second duct 100 or the console body 15.

When the console body 15 slides, the second hook 700 and the second duct 100 also slide. Accordingly, when the second hook 700 is fixed to the first duct 200 and restricts relative sliding of the first duct 200 and the second duct 100, the overlap length of the first duct 200 and the second duct 100 decreases. When the second hook 700 is released from the first duct 200 and does not restrict relative sliding of the first duct 200 and the second duct 100, the overlap length of the first duct 200 and the second duct 100 increases.

In detail, according to the configuration of the vehicle sliding console of embodiments of the present invention, first, the rail 10 is installed on a vehicle floor. The console body 15 slides along the rail 10 and is connected to the rail 10 to slide on the floor. In general, the console body 15 is disposed in the longitudinal direction of a vehicle and slides on the rail 10, and the first duct 200 and the second duct 100 are positioned inside the console body 15.

The rail 10 extends in the front-rear direction of the vehicle, the console body 15 slides forward and backward, and the floor duct 20 may extend forward and backward. The console body 15 slides forward or backward through the rail 10 extending in the front-rear direction of the vehicle, and when the console body 15 slides to the middle from the front, the floor duct 20 and the first duct 200 are matched and are fixed by the first hook 800.

In detail, a stopper 900 is disposed on the rail 10, and when the inlet of the first duct 200 is matched with the outlet of the floor duct 20, the position of the first hook 800 is fixed by the stopper 900. Referring to FIG. 2, the first hook 800 connects the first duct 200 and the floor duct 20 to each other and is rotated about an axis through a spring. Accordingly, when a protrusion formed on the first hook 800 is locked to the stopper 900 and when the console body 15 is at a neutral position or has slid backward, the inlet of the first duct 200 and the outlet of the floor duct 20 are matched and maintained in a fixed state.

The first duct 200 can slide with respect to the console body 15 and the first hook 800 is provided to selectively fix a position when the inlet of the first duct 200 is matched with the outlet of the floor duct 20 connected to an air-conditioning system of the vehicle. The floor duct 20 is connected to the air-conditioning system at the front of the vehicle to receive air, and when the first duct 200 and the second duct 100 are fixed by the second hook 700, the first duct 200 slides with the console body 15.

The first duct 200 and the second duct 100 extend in the front-rear direction of the vehicle. The first duct 200 slides forward and backward with the console body 15 and is fixed or released at the sliding position by the first hook 800, and the second duct 100 slides forward and backward with the first duct 200 and is fixed by the second hook 700.

When the floor body and the first duct 200 are fixed by the first hook 800, the outlet of the floor duct 20 is connected to the inlet of the first duct 200, thereby enabling air flowing in the air-conditioning system to flow. Further, the inlet of the first duct 200 is connected to the inlet of the second duct 100, so air flows into the second duct 100. Further, the rear end of the second duct 100 is connected to the interior of the vehicle. Accordingly, an integrated duct channel structure that can discharge air into the interior of the vehicle can be formed.

The second duct 100 is provided such that the position thereof is fixed in the console body 15, is coupled to the outlet of the first duct 200 to overlap the first duct 200 like a double pipe, and the slide with respect to the first duct 200.

Referring to FIG. 2, the second hook 700 is provided in the console body 15, and is fixed and restricts relative sliding of the first duct 200 and the second duct 100 when the overlap length of the first duct 200 and the second duct 100 is increased. The entire duct is extended or contracted by the second hook 700 in accordance with the overlap length of the first duct 200 and the second duct 100. Further, since the second hook 700 restricts relative sliding of the first duct 200 and the second duct 100 in accordance with the overlap length of the first duct 200 and the second duct 100, the first duct 200 and the second duct 100 are strongly or reliably fixed, so the performance of the entire duct is improved.

When the overlap length of the first duct 200 and the second duct 100 is increased, the total length of the first duct 200 and the second duct 100 is decreased. When the overlap length of the first duct 200 and the second duct 100 is decreased, the total length of the first duct 200 and the second duct 100 is increased.

A duct rail 300 provided in the console body 15 is formed such that the second duct 100 slides the first duct 200. The second duct 100 slides the first duct 200 on the duct rail 300 provided outside and slides with respect to sliding of the console body 15 and the first duct 200. A moving structure upper 400 is formed to cover the first duct 200, supports the duct rail 300, and is connected to the upper portion of the sliding bracket 500.

Referring to FIG. 4, the sliding console may further include a sliding bracket 500 provided at the first duct 200 and having a first protrusion B and a second protrusion A and a lower plate 600 provided at the console body 15 and supporting and fixing the second hook 700.

The first protrusion B and the second protrusion A of the sliding bracket 500 are disposed at the lower portion of the first duct 200 and can be used to release the first hook 800. The first hook 800 can be released by sliding the console body 15 forward with the inlet of the first duct 200 matched with the outlet of the floor duct 20.

In more detail, in order to release the first hook 800, when the console body 15 slides forward, the lower plate 600 supporting and fixing the second hook 700 pushes the second protrusion A toward the first hook 800 and the first protrusion B pushes and rotates the first hook Boo because the second protrusion A and the first protrusion B are formed at the same sliding bracket 500. Accordingly, the first hook 800 is pushed by the first protrusion B and can be unlocked from the stopper 900 by rotating.

Similarly, the second hook 700 fixes the first duct 200 and the second duct 100 by rotating, thereby being able to restrict relative sliding of the first duct 200 and the second duct 100. The second hook 700 restricts relative sliding of the first duct 200 and the second duct 100 by fixing them when it is seated in a groove formed at sides of the first protrusion B and the second protrusion A. Further, since the second hook 700 is kept pressed upward by the spring, it can keep the first duct 200 and the second duct 100 fixed. When the console body 15 slides backward, the second hook 700 is pushed backward by pressure and is separated out of the grooved form on the sliding bracket 500, whereby the second hook 700 can be released from the first duct 200.

FIGS. 5 to 7 are views showing states in which a console body 15 is at a neutral position, is slid forward, and is slid backward, respectively. FIGS. 5 to 7 show three states. The first one is the state in which the console body 15 is positioned at the middle without sliding forward or backward and the second one is the state in which the console body 15 has slid forward. The third one is the state in which the console body 15 has slid backward.

In the three states, the state in which the inlet of the first duct 200 is matched with the outlet of the floor duct 20, the position of the first duct 200 is fixed by the first hook 800, and the first duct 200 and the second duct 100 are fixed by the second hook 700 can be defined as the neutral state. The state in which the console body 15 slides forward and the first duct 200 and the second duct 100 are fixed by the second hook 700 can be defined as the forward-sliding state.

Further, referring to FIG. 3, the state in which the console body 15 slides backward, the position of the first duct 200 is fixed by the first hook 800, the second hook 700 is released, and the first duct 200 and the second duct 100 slide can be defined as the backward-sliding state.

The neutral state, the forward-sliding state, and the backward-sliding state are defined in accordance with the sliding state of the console body 15, as shown in FIGS. 5 to 7, and it is possible to easily know the positions of the first duct 200, the second duct 100, the first hook 800, and the second hook 700 from the states.

As a result, according to the vehicle sliding console of embodiments of the present invention, it is possible to improve the performance of the sliding console by strongly and reliably fixing a moving part and a fixed part by applying a structure additionally having an assistant hook in the fixed part without using a hook of the related art for a fixing concept of the moving part and the fixed part in a structure for locking or unlocking the moving part to or from a duct stopper on a rail using a hook, and it is possible to greatly reduce the size of a lower plate by applying the assistant hook, whereby it is possible to decrease the weight and the manufacturing cost.

Although the present invention was provided above in relation to specific embodiments shown in the drawings, it is apparent to those skilled in the art that the present invention may be changed and modified in various ways without departing from the scope of the present invention, which is described in the following claims.

What is claimed is:

1. A sliding console of a vehicle, the sliding console comprising:
   a rail designed to be installed on a vehicle floor;
   a console body connected to the rail and configured to slide on the vehicle floor;
   a first duct disposed in the console body and configured to slide with respect to the console body, the first duct having a first hook configured to selectively fix a position when an inlet of the first duct is matched with an outlet of a floor duct;
   a second duct disposed in the console body such that a position thereof is fixed, coupled to an outlet of the first duct to overlap the first duct like a double pipe, and configured to slide with respect to the first duct; and
   a second hook configured to restrict relative sliding of the first duct and the second duct in accordance with an overlap length of the first duct and the second duct.

2. The sliding console of claim 1, wherein the rail extends in a front-rear direction of the vehicle, the console body is configured to slide forward and backward, and the floor duct extends forward and backward.

3. The sliding console of claim 1, wherein the first duct and the second duct extend in a front-rear direction of the vehicle, the first duct is configured to slide forward and backward with the console body, and the second duct is configured to slide forward and backward with the first duct.

4. The sliding console of claim 1, wherein the outlet of the floor duct is connected to the inlet of the first duct, the outlet of the first duct is connected to an inlet of the second duct, and a rear end of the second duct is configured to be connected to an interior of the vehicle.

5. The sliding console of claim 1, wherein a duct rail is disposed on the console body and the second duct is configured to slide the first duct through the duct rail.

6. The sliding console of claim 1, further comprising a stopper disposed at the rail, wherein a position of the first hook is fixed through a spring when the inlet of the first duct is matched with the outlet of the floor duct.

7. The sliding console of claim 1, wherein a neutral state comprises a state in which the inlet of the first duct is matched with the outlet of the floor duct, a position of the first duct is fixed by the first hook, and the first duct and the second duct are fixed by the second hook.

8. The sliding console of claim 1, wherein a forward-sliding state comprises a state in which the console body is slid forward and the first duct and the second duct are fixed by the second hook.

9. The sliding console of claim 1, wherein a backward-sliding state comprises a state in which the console body is slid backward, a position of the first duct is fixed by the first hook, the second hook is released, and the first duct and the second duct are able to slide.

10. The sliding console of claim 1, wherein the first hook is configured to be released when the console body slides forward with the inlet of the first duct and the outlet of the floor duct matched.

11. The sliding console of claim 1, wherein the second hook is disposed at the console body, and when the overlap length of the first duct and the second duct is increased, the second hook is fixed and is configured to restrict relative sliding of the first duct and the second duct.

12. The sliding console of claim 1, wherein the second hook is configured to restrict relative sliding of the first duct and the second duct by fixing the first duct and the second duct by rotating.

13. A sliding console of a vehicle, the sliding console comprising:
    a rail installed on a vehicle floor;
    a console body connected to the rail and configured to slide on the vehicle floor;
    a first duct disposed in the console body and configured to slide with respect to the console body, the first duct having a first hook configured to selectively fix a position when an inlet of the first duct is matched with an outlet of a floor duct;
    a second duct disposed in the console body such that a position thereof is fixed, coupled to an outlet of the first duct to overlap the first duct like a double pipe, and configured to slide with respect to the first duct;
    a second hook configured to restrict relative sliding of the first duct and the second duct in accordance with an overlap length of the first duct and the second duct;
    a sliding bracket disposed at the first duct and having a first protrusion and a second protrusion; and
    a lower plate disposed at the console body and configured to support and fix the second hook.

14. The sliding console of claim 13, wherein when the overlap length of the first duct and the second duct is increased, the second hook is fixed to the sliding bracket and is configured to restrict relative sliding of the first duct and the second duct.

15. The sliding console of claim 13, wherein when the console body slides forward, the lower plate is configured to push the second protrusion and simultaneously the first hook is configured to be pushed and released by the first protrusion.

16. A vehicle comprising:
    a vehicle body comprising a vehicle floor;
    an air-conditioning system connected to a floor duct;
    a rail installed on the vehicle floor and extending in a front-rear direction of the vehicle;
    a console body connected to the rail and configured to slide forward and backward on the vehicle floor;
    a first duct disposed in the console body and configured to slide with respect to the console body, the first duct having a first hook configured to selectively fix a position when an inlet of the first duct is matched with an outlet of the floor duct;

a second duct disposed in the console body such that a position thereof is fixed, coupled to an outlet of the first duct to overlap the first duct like a double pipe, and configured to slide with respect to the first duct; and a second hook configured to restrict relative sliding of the first duct and the second duct in accordance with an overlap length of the first duct and the second duct.

17. The vehicle of claim 16, wherein the first duct and the second duct extend in the front-rear direction of the vehicle, the first duct is configured to slide forward and backward with the console body, and the second duct is configured to slide forward and backward with the first duct.

18. The vehicle of claim 16, wherein the outlet of the floor duct is connected to the inlet of the first duct, the outlet of the first duct is connected to an inlet of the second duct, and a rear end of the second duct is connected to an interior of the vehicle.

19. The vehicle of claim 16, wherein the console body is configured to be in one of a plurality of states, the plurality of states comprising:

a neutral state in which the inlet of the first duct is matched with the outlet of the floor duct, a position of the first duct is fixed by the first hook, and the first duct and the second duct are fixed by the second hook;

a forward-sliding state in which the console body is slid forward and the first duct and the second duct are fixed by the second hook; or a backward-sliding state in which the console body is slid backward, a position of the first duct is fixed by the first hook, the second hook is released, and the first duct and the second duct are able to slide.

20. The vehicle of claim 16, wherein the second hook is disposed at the console body, and when the overlap length of the first duct and the second duct is increased, the second hook is fixed and is configured to restrict relative sliding of the first duct and the second duct.

* * * * *